Jan. 4, 1938.  W. B. KERRICK  2,104,705
APPARATUS AND METHOD FOR TREATMENT OF LIQUIDS
Original Filed Nov. 14, 1930   3 Sheets-Sheet 1

INVENTOR:
WALTER B. KERRICK.
BY Baldwin Vale
ATTORNEY.

Jan. 4, 1938. W. B. KERRICK 2,104,705
APPARATUS AND METHOD FOR TREATMENT OF LIQUIDS
Original Filed Nov. 14, 1930  3 Sheets-Sheet 3

INVENTOR:
WALTER B. KERRICK.
BY
ATTORNEY.

Patented Jan. 4, 1938

2,104,705

UNITED STATES PATENT OFFICE 2,104,705

APPARATUS AND METHOD FOR TREATMENT OF LIQUIDS

Walter B. Kerrick, Los Angeles, Calif., assignor, by mesne assignments, to Clayton Manufacturing Company, Alhambra, Calif., a corporation of California Continuation of application Serial No. 495,636, November 14, 1930. This application October 9, 1934, Serial No. 747,654

13 Claims. (Cl. 299—84)

This invention relates to improvements in fluid heaters and more particularly to an apparatus and methods for heat treating liquids and various solutions.

The principal object of the invention is to provide means for subjecting liquids, such as colloidal solutions, to precisely maintained conditions of quantity, volume, temperature, pressure, and speed of flow.

Another object is to avoid dry spots or localized areas of heating surface, liable to burn out the heater, deposit scale and injure the liquid.

Other objects and advantages will appear as the description progresses.

In this specification and the accompanying drawings the invention is disclosed in its preferred form, but it is to be understood that it is not limited to this form because it may be embodied in other forms. It is also to be understood that in and by the claims following the description, it is desired to cover the invention in whatsoever form it may be embodied.

The present embodiment of the invention has to do particularly with the treatment of colloidal liquids such as soapy and other solutions, with the object of refining the solutions to render them more effective. The improved results very economically accomplished in the present apparatus, are largely due to the finer division or comminution of the soap particles and their more uniform diffusion throughout the liquid.

So far as I am aware there is no apparatus of this nature through which it is possible to pass a soapy or similar solution that will not burn the solution or choke the heating coils with precipitates. One prime advantage of the present invention is the maintenance of a solid column of fluid with a progressively rising temperature and velocity, in which surging and foaming is prevented. Such solid column of fluid may include small steam or vapor bubbles formed during the operation of the apparatus under the conditions of temperature and pressure set out hereinafter, and in which column said bubbles are maintained dispersed or segregated by the velocity of flow of the liquid through the coil, whereby the formation of the undesirable "dry spots" or "localized areas of heating surface" referred to hereinbefore is precluded. Moreover, the maintenance of steam bubbles in the segregated state also serves to prevent the formation of substantial pockets of vapor in the heating coil and this eliminates surging and foaming during discharge.

This application is a continuation of my application Serial No. 495,636, filed November 14, 1930, for Fluid heaters. For further particulars reference should also be made to my two co-pending applications, Serial No. 495,634, filed November 14, 1930, for Method of treating liquids, and Serial No. 495,635, filed November 14, 1930, for Thermostatic controls.

For the purpose of illustrating one practical form of the invention, the same is herein shown embodied in an apparatus for treating a cleaning solution to form a spray of uniform character and applying such spray to a surface to be cleaned. However, the adaptation of the principles of the invention for other uses will be obvious.

In the accompanying three sheets of drawings.

Figure 2:
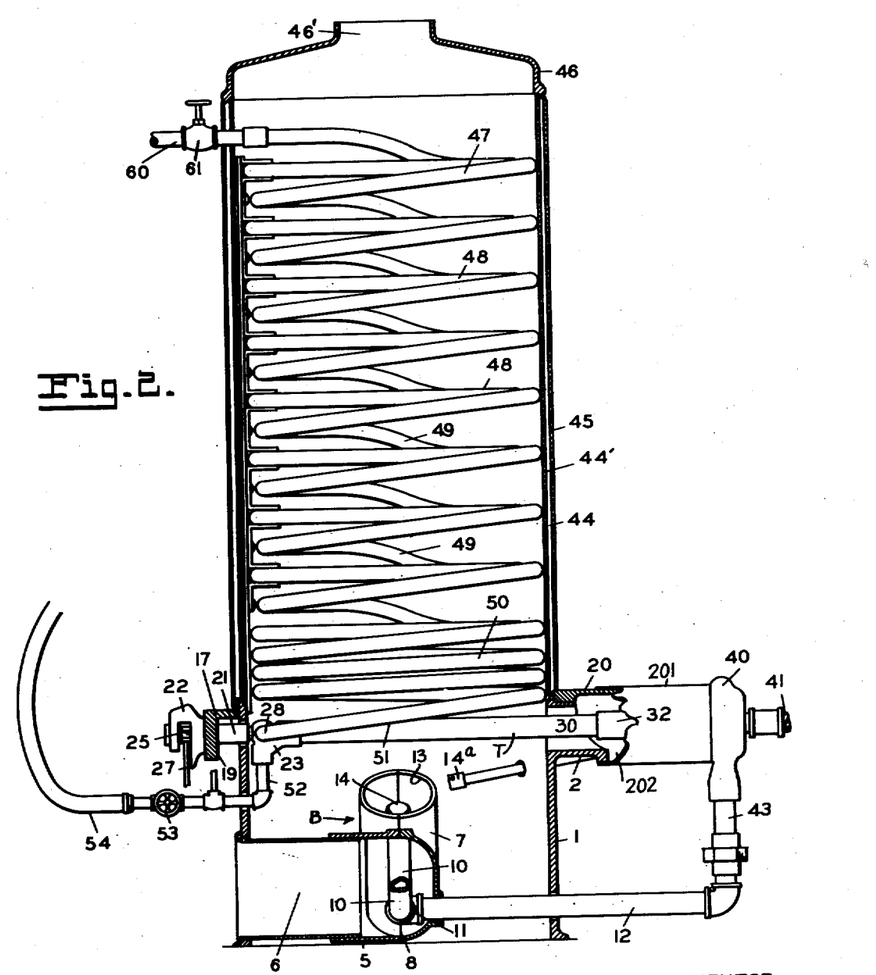
Fig. 2 is a vertical section partially in full lines, of the liquid heater forming part of the apparatus.
Figure 3:
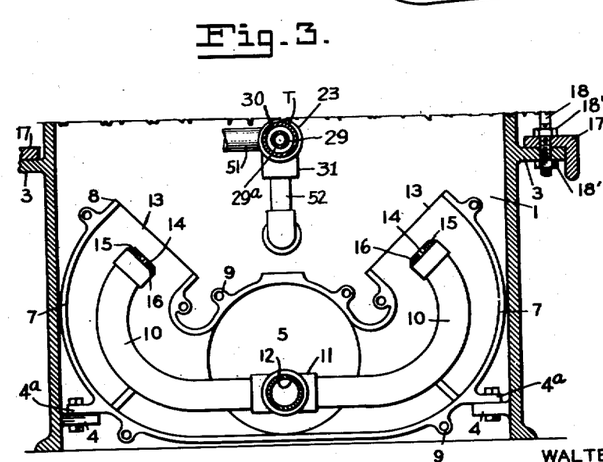
Fig. 3 is a similar view of the furnace portion showing the gas nozzles in full lines.

In detail the construction illustrated in the drawings, referring to Figs. 2 and 3, comprises the base section or combustion chamber 1, preferably of cast iron. This base has the neck 2 formed thereon near the top, through which the thermostatic unit T may be passed in assembling the apparatus. The base 1 also has the projecting lugs 3 upon which the thermal unit base ring 17 is supported. It also has the internal lugs 4—4 to support the burner B, or other source of heat.

The burner B comprises the throat 5, and tuyères 7—7 having lugs 4ª bolted to the lugs 4. The throat 5 has the tubular intake 6, extending through the side of the base 1 and open to the atmosphere. The tuyères 7—7 are curved and lead laterally from opposite sides of the throat 5 and are directed toward each other with their axes meeting at about 45° to each other, as shown in Fig. 3. These tuyères are divided on the line 8 and bolted together by bolts (not shown) passing through the lugs 9—9 at intervals to facilitate production and the later introduction of the gas nozzles 10—10.

The gas nozzles 10—10 are screwed into the T 11, which is screwed onto the end of the gas supply pipe 12. These nozzles are bent to follow the radial axes of the tuyères 7, wherein they terminate back of the mouths 13—13 of the tuyères. The gas tips 14—14 are screwed onto their respective nozzles and have the beveled edges 15—15 with the perforations 16 extending therethrough.

The jets of gas issuing from the perforations 16 cross the currents of air passing through the tuyères 7—7, and impinge upon the walls of the tuyères adjacent the outlets thereof where ignition takes place to form columnar flames the shape of the outlets 13. These flames, directed together by the tuyères, meet at the center of the combustion chamber 1 and intermingle into a single vertical column of flame, substantially round as molded by the annulus of the combustion chamber 1, and the cylindrical lower coil of the heater tube, more fully described hereinafter. The burner is ignited by the usual pilot light 14a within the combustion chamber.

This type of burner is highly efficient in the burning of natural gas, which must be handled very differently from manufactured gas owing to the fact that it is slow to ignite and easily extinguished. These conditions are dangerous in connection with thermostatic control with a burner less perfect than that described. It is to be understood however that other forms of gas heaters, electric elements and similar heating units susceptible to thermostatic control, may be substituted for the burner disclosed.

The thermostatic element T is located above and within the path of the flame issuing from the burner B. Both ends of this element project through the walls of the combustion chamber without contact therewith, as clearly shown in Fig. 2. In order that the thermal element may be unaffected by extraneous conditions, it is mounted in a base of novel construction.

This base consists of the annulus or ring 17, exteriorly encircling the combustion chamber, but circumferentially spaced therefrom and resting upon the lugs 3—3, to which it is fixed by the threaded ends of the tie rods 18—18 which pass through the ring 17 and the lugs 3—3, said ring and lugs being secured together between the running nuts 18'.

On a diametrical line transverse to the lugs 3—3, the anchor boss 19 and the neck 20 are formed on the ring 17. A sleeve 201 surrounds the neck 20 and closes a lateral opening 202 therein. The boss 19 is threaded to receive the guide 21 which is screwed therethrough. The yoke 22 is threaded on this guide and jammed against the boss 19 to lock the guide and yoke in fixed relation to the ring 17.

The bypass head 23 has one end of the trunnion 24 fixed therein and slidably arranged in the guide 21. The other end of this trunnion is threaded through the running nut 25, confined in the slot 26 in the yoke 22. This nut may be provided with the handle 27. The turning of the nut gives a micrometric longitudinal adjustment of the trunnion 24.

The head 23 has the side outlet 28 into which the discharge end 51 of the heater tube 47 is fixed, and connects with the center tube 29 of the thermal unit. The external tube 30 is screwed into the head 23 and surrounds the inner tube 29. The inner end of the tube 29 is also screwed into the head 23 and the outer end of the tube 29 terminates near the free end of the outer tube 30 and is flared or expanded outwards and notched so that it is held coaxial with the outer tube, leaving an annular return space 29a between these tubes. This annular space discharges from the head 23 at the spud 31.

The free end of the external tube 30 is screwed into the cap 32, into which the valve stem 33 is also coaxially screwed, and locked by the nut 34. This stem is slidably guided in the stuffing box 35, provided by the plug 36 fixed into the end of the neck 20 of the base ring 17 by the setscrew 36'.

Figures 4, 5:
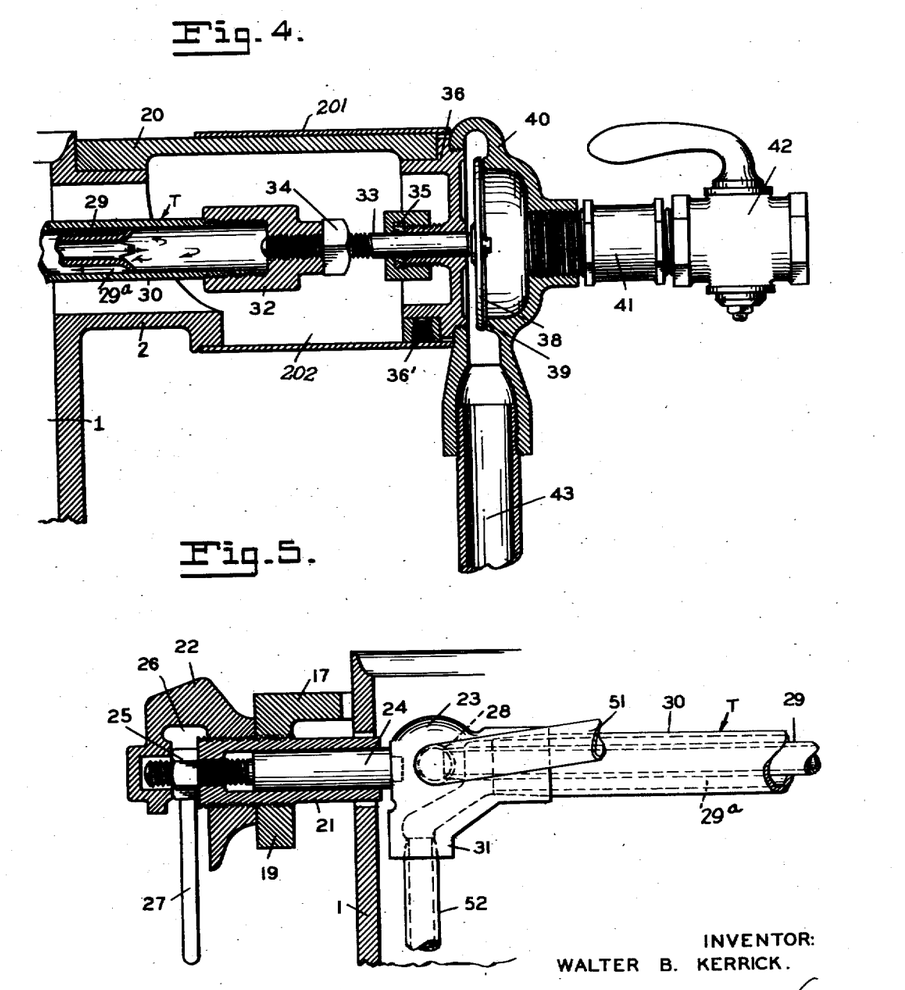
Fig. 4 is an enlarged detail of the valve end portion of the thermostatic fuel control, shown in vertical section.
Fig. 5 is a similar view of the opposite end of the same.

The disc valve or fuel control valve 38 is freely mounted upon the end of the valve stem 33 and adapted to seat evenly against the annular valve seat 39 formed and finished on the inner face of the valve housing 40 screwed onto the plug 36. This housing has the service pipe 41 screwed thereinto to supply gas fuel through the manual plug valve 42. The outlet pipe 43 leads from this housing, below the disc valve 38, to the burner supply pipe 12, as shown in Figs. 2 and 4.

It is obvious that the longitudinal expansion and contraction of the tube 30 will open and close the fuel supply valve 38 and determine the volume of heat produced by the burner within the combustion chamber 1.

It is equally manifest that conducting the discharge from the end 51 of the heater coil into the head 23 through the tube 29 and back through the tube 30 will modify the thermostatic behavior of the tube 30, will vary the fuel supply to compensate for the difference in temperature between the external flame and the internal liquid, and to maintain them at a thermal equilibrium determined by the manual adjustment of the nut 25, which in turn determines the opening and closing moment of the fuel valve 38.

The heater comprises the casing 44 which forms a continuation of the wall of the combustion chamber. This casing is preferably composed of two interspaced walls 44'—45 enclosing sheet asbestos or other heat insulating material. The casing is topped by the cover 46 having the vent 46' and held in position by the tie rods 18—18 engaging the lugs on the cover 46.

The heater tube 47 enters the casing at the top and is arranged in a series of spiral coils 48—48 joined by their descending ends 49—49.

The lower coil 50 of the series is preferably made cylindrical to provide combustion space above the burner and to absorb the heat given off laterally from the burner, which materially lowers the temperature of the lower part of the casing 44.

The end 51 of the coil 50 is fixed in the head 23 at 28 and discharges through the thermostat, as previously described. The outlet pipe 52 is screwed into the spud 31, and leads through the manual valve 53 into the hose 54. The nozzle 55 on this hose has the tip 55' thereon with a calibrated oval orifice proportioned to the capacity of the apparatus, under the fixed predetermined conditions hereinafter more fully described.

Figure 1:
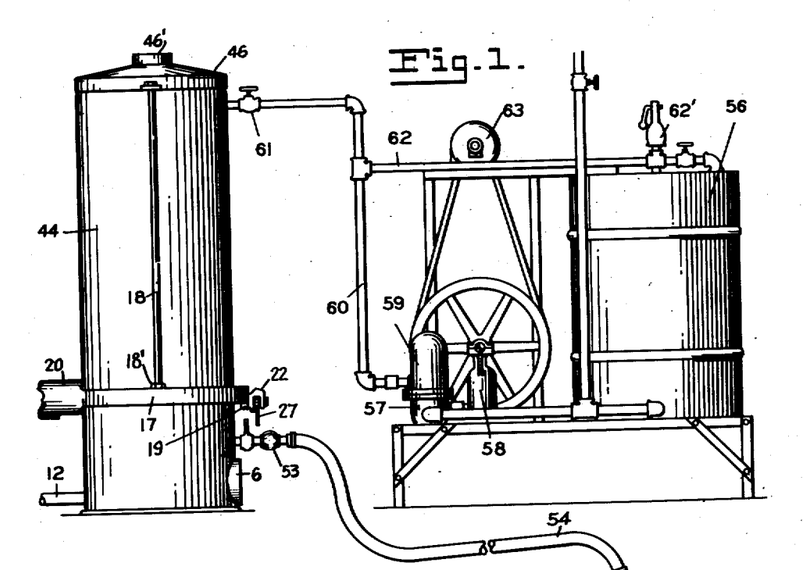
Fig. 1 is a diagrammatic side elevation of a heating apparatus constructed in accordance with this invention.

Referring to Fig. 1, the solution to be treated is mixed in the receiving tank 56, from which it is drawn into the pump chamber 57 of the pump 58. The usual check valve (not shown) is interposed between the supply chamber 57 and the pump 58. Another check valve (not shown) operates between the pump and the base of the air chamber 59 into which the pump discharges. The lower level of the air chamber 59 is connected by the pipe 60, through the manual valve 61, with the upper end 47 of the heater coils 48.

The return pipe 62 is interposed in the pipe 60 and leads back to the receiving tank 56, through the relief valve 62', to protect the heater against excess pressure. The relief valve is set to blow off at a pressure above the normal operating pressure.

The pump is driven by the motor 63 and the interposed pulleys and belt transmission, or otherwise.

It has been proved in practice that by the use of this invention very mild soapy solutions are rendered effective in cleaning road grime and oily deposits from road vehicles, garage, machine shop and factory floors, and similar surfaces. Even deposits which resist the action of strong soapy and caustic solutions otherwise applied are effectively removed by the use of the invention.

A solution of any ordinary household bar soap or soap chips, consisting of 9 oz. of soap dissolved in 30 gallons of water, about 9 oz. of soap to 3,840 ounces of water, is effective at relatively low temperature, pressure and velocity although it will be obvious that these proportions are not critical.

The success of this invention depends very largely upon the maintenance of constants in the quantity of solution delivered to the elongated heater tube, which is determined by the capacity of the pump; a practically constant unbroken body or column of solution in the heater tube, which is maintained by the calibrated outlet orifice 55' in combination with said check valves to prevent surging; and practically constant volume of heat in the combustion chamber, determined by the thermostatic unit T. The air chamber 59 merely counteracts the pulsations of the pump. There are four constants to be maintained as precisely as is mechanically possible, viz; quantity, body, heat and discharge.

This invention operates substantially as follows: The soap and water or other desired mixture or solution is placed in the tank 56. From the tank the solution is forced through the coils 48 in quantities definitely measured by the pump 58. The capacity of the discharge orifice 55' is such that a back pressure is built up within the coils 48. This volumetric proportion between the capacity of the pump and the capacity of the orifice assures a continuous column of fluid, a desirable velocity of flow while passing through the coils 48 and prevents precipitation and scaling of the tubes.

The liquid flowing downward toward the source of heat in the combustion chamber, is gradually heated until it reaches maximum temperature in the tube 30.

In the present use of the invention for treating and spraying cleaning solutions, the maximum desirable temperature is about 350° F. to 375° F. in the tube 30. This temperature elongates the thermostat tube 30 which moves the fuel control valve 38 to the proper position with respect to the seat 39 to maintain the desired temperature as adjusted by the nut 25, or the stem 33 and nut 34, see Fig. 5.

The rise in temperature in the coils 48, expands the liquid therein, progressively increasing the velocity as it approaches and passes through the orifice 55' in the nozzle 55. This increase in velocity of the stream as it passes through the orifice 55' is also due to the conversion or flashing of some of the water of the solution into steam as described more fully below. Since the column of fluid cannot back up beyond the pump 59 and it is constantly being replaced by the new liquid pumped in, steam or vapor cannot segregate and remain in the coils 48; therefore, a constant column of fluid is at all times maintained in the tubes of the heater. The fluid in the case just considered is, of course, water at 184 lbs. absolute pressure and at a temperature of 375° F. It will be readily appreciated by those familiar with the properties of saturated steam that under the conditions of pressure and temperature given, said water may be in the nature of the fluid previously described, that is to say, contain steam or vapor bubbles which are maintained substantially segregated because of the high velocity at which the stream is pumped through the heating coil. It will also be apparent that because of said high velocity, the hot stream flowing through the heating coil is given little time in which to absorb enough latent heat to produce steam bubbles in excessive or undesirable volume. This affords an explanation of why the formation of dry spots or pockets of steam in the coil, and surging and foaming of the stream at the nozzle, is avoided. Whenever this hot stream emerges from the heater at a temperature of 375° F. a portion thereof, because of the substantial drop in pressure, instantly vaporizes or flashes into saturated steam at atmospheric pressure and at a temperature of about 212° F. and the water is instantly lowered to this temperature. If the device is used where the relative humidity of the air is below the saturation point, some further evaporation takes place just after the jet leaves the nozzle and the fluid striking the object to be cleaned is at temperatures considerably below the atmospheric boiling point.

The temperature, pressure and velocity of the liquid can be raised or lowered at will by swinging the handle 27 to thermostatically control the capacity of the valve 38. So long as a constant flow of fluid is maintained therein, there can be no vapor segregated within the heater tubes at any temperature.

The form and arrangement of the heater tubes, in combination with the gas heater and interposed thermostat unit has proved very satisfactory, but the structure of these elements may be varied or substituted, without departing from the spirit of this invention, so long as the conditions specified can be accurately proportioned and maintained.

The joining of the ring 17 to the lugs 3 of the combustion chamber is a refinement adding greater accuracy to the thermostatic control. Under usual working conditions the base ring 17 will absorb some heat from the wall 1 of the combustion chamber. Any heating of the ring 17 will cause it to expand and open the valve 38. I have found that fixing the ring 17 to the combustion chamber at diametrical points transverse to the diameter across which the thermostatic element extends, will cause the ring 17 to distort out of round transversely across the line of the thermostat. The transverse distortion of the ring 17 is caused by the expansion of the combustion chamber 1 and the consequent pressure against the ring 17 at 3—3. It has been found that the distortion is equal to the ring expansion, so that the extraneous effect on the valve 38 is nil and precision is maintained in the thermal valve unit.

It will be clear from the foregoing that, while any steam or vapor bubbles formed in the coil by heating the flowing stream are maintained in a substantially segregated condition, additional liquid expands or is converted into vapor with a consequent drop in pressure and temperature upon venting the heated stream into an atmosphere under pressure lower than that in the coil 47. This temperature drop is so pronounced at the proper operating distance of about one foot from the nozzle, that the treated soapy solutions can be applied to the most delicate lacquer surfaces and fine fabrics without the least danger of injury from the heat or the ingredients in the solution. It is not too much to say that any texture that can withstand the action of cold water may be cleaned with perfect safety. The reason for this is that the solution is so homogeneous that the particles of soap are so minute and so evenly diffused that they do not coagulate or collect on the surface in sufficient quantity to react therewith; their affinity is for the oily scum or accumulations thereon. A further reason is that the drop in temperature is sudden enough to eliminate the heat danger, before the velocity of the jet is spent; thus retaining the advantages of the hydraulicking or bombarding effect of the wet vapor against the surface to be cleaned. Furthermore, very little water is actually used. The jet is neither dry steam nor saturated vapor but hot water containing a small percentage of its weight of saturated steam. The surface treated dries almost immediately and the human hand can be held in the jet within a foot or so of the nozzle tip 30. Soapy solutions thus treated are far superior when used for laundry purposes, whether jetted against the fabrics or used in bulk in the conventional manner.

It should be noted that the tube 30 is the heat responsive element of the thermostat. As previously stated, this tube is acted upon externally by the products of combustion from the burner being heated and expanded thereby which tends to close the valve 38 and shut off the supply of fuel passing to the burner. When liquid is being discharged through the hose 54 this liquid flows through the tube 55' and tends to cool it, thus contracting the tube and tending to close the valve 38. If the flow of liquid through the tube 30 is reduced, the cooling action of the liquid inside the tube is reduced and the valve 38 partially closes, thus reducing the amount of fuel supplied to the burner. If the flow of liquid passing through the tube 30 is increased, the cooling action is increased and more fuel is supplied. With liquid passing through the tube 30 at a constant rate and at a substantially constant temperature, the action of the tube is wholly dependent upon the temperature of the products of combustion of the burner and the tube 30 acts to maintain the temperature of the liquid at a substantially constant value.

It will be noted that the disc valve 38 is moved by the expansion of the tube 30. This tube is heated by the combustion products from the burner, which products pass upwardly therearound. The tube is cooled by the fluids passing through the inside thereof. The temperature of the tube 30 is a mean temperature between the temperature of the combustion products which surround it and heat it and the temperature of the fluids which pass through it and cool it.

It will be clear from the foregoing that in order to produce a spray of constant character it is necessary to correlate the quantity of input or rate of pumping with the capacity or rate of discharge of the spray nozzle so that an unbroken body or column of fluid under pressure and free from steam pockets will be maintained in the heating coil; and furthermore, that the fuel supply must be nicely manipulated with due regard to the qualities of the stream in order that said stream will have acquired during its flow through the heating coil those desirable properties which will convert at least a portion thereof into vapor upon discharge into an atmosphere at a pressure lower than that maintained in the coil.

I claim as my invention:

1. In combination in an apparatus for producing a cleaning jet of constant character and containing steam, water and a detergent, which jet is effective in cleaning surfaces when discharged at a short distance therefrom: a heater providing pipe means defining an elongated passage; pump means for pumping water containing a detergent at a substantially constant uniform rate into one end of said elongated passage; thermodynamic control means including a tube of material which expands when heated; means for conducting fluid from the other end of said elongated passage through and along said tube to flow in contact with the inner wall of said tube; a conduit connected to the discharge end of said tube; a nozzle into which said conduit discharges and providing an orifice of a size predetermined with relation to said rate of pumping and the character of spray to be produced and acting to build up a pressure in said tube; a burner for burning a fuel and producing products of combustion, said burner being so positioned with respect to said tube that said products of combustion play directly on the exterior of said tube of said thermodynamic control means, whereby said tube is heated by said products of combustion and thus transfers heat to the fluid flowing in contact with said inner wall thereof, thus causing the tube itself to be at a temperature intermediate the temperature of the products of combustion and the fluid flowing therethrough, said products of combustion rising externally of said pipe means to progressively heat the fluid therein during continuous stream flow thereof through said elongated passage with sufficient turbulence to insure delivery to said tube of a uniform detergent fluid; and means operated by the expansion and contraction of said tube and thus responsive to said intermediate temperature thereof for decreasing the fuel supplied to said burner when said intermediate temperature rises and for increasing the fuel supply when said intermediate temperature falls thus controlling the thermodynamic conditions of the fluid delivered to said nozzle, said thermodynamic control means being so constructed and arranged as to correlate the supply of fuel to said rate of pumping and nozzle orifice size in a manner to maintain said fluid at a predetermined temperature such that when the fluid is discharged into the atmosphere at least a portion thereof will vaporize and thus maintain a cleaning jet of said constant character discharging from said nozzle toward the surface to be cleaned.

2. A combination as defined in claim 1 in which said pump means forces said water containing said detergent into that end of said elongated passage farthest removed from said burner, thereby progressively heating the same by movement thereof into a progressively hotter zone until it reaches said tube wherein it is subjected to the maximum temperature.

3. In combination in an apparatus for producing a high velocity jet of substantially constant temperature and character: a heater providing a pipe means defining an elongated passage of restricted cross sectional area and providing an intake and discharge end, there being an expansible tube near the discharge end of said elongated passage and cooperating in defining one section thereof whereby a stream of material flowing through said elongated passage moves with turbulence due to the restricted cross sectional area thereof and moves in contact with the inner wall of said expansible tube in heat-transferring relationship therewith before being discharged from said elongated passage; pump means for delivering a stream of liquid containing a detergent at a substantially constant uniform rate to the intake end of said elongated passage with sufficient pressure to overcome any pressure existing therein during operation of the device; a burner adjacent said expansible tube for delivering products of combustion directly into contact therewith, said products of combustion also moving exteriorly of said pipe means to heat said material flowing therein, said products of combustion being hotter than said expansible tube whereby said tube is heated externally by said products and transfers heat to the stream of material flowing therethrough thus assuming a temperature intermediate the temperature of said products of combustion and said material flowing therethrough; means for mounting said expansible tube to permit one end thereof to move axially in response to the expansion and contraction of said tube when said intermediate temperature varies; means for delivering fuel to said burner; control means for controlling the amount of fuel so delivered to said burner; means operatively connecting said movable end of said expansible tube to said control means to decrease and increase the fuel supply in response to an increase and decrease respectively in said intermediate temperature of said expansible tube to maintain said liquid at a predetermined temperature of such a degree that when the liquid is discharged into the atmosphere at least a portion thereof will vaporize; and a jet discharge nozzle connected to the discharge end of said elongated passage, said nozzle having an orifice of a predetermined size correlated to the delivery rate of said pump means for controlling the pressure in said expansible tube and for discharging the form of jet desired, said expansible tube and control means being so constructed and arranged as to correlate the supply of fuel to said rate of pumping and nozzle discharge to thus maintain said desired temperature, whereby a high velocity detergent jet of said constant character will be produced when said liquid is discharged into said atmosphere.

4. In combination in an apparatus for producing a high velocity jet of substantially constant temperature and character: a heater providing a pipe means defining an elongated passage of restricted across sectional area and providing an intake and discharge end, there being an expansible tube near the discharge end of said elongated passage and cooperating in defining one section thereof whereby a stream of material flowing through said elongated passage moves with turbulence due to the restricted cross sectional area thereof and moves in contact with the inner wall of said expansible tube in heat-transferring relationship therewith before being discharged from said elongated passage; pump means for delivering a stream of liquid containing a detergent to the intake end of said elongated passage at a predetermined uniform rate and with sufficient pressure to overcome any pressure existing therein during operation of the device; a burner producing products of combustion for heating said pipe means and positioned to direct products of combustion directly against said expansible tube thereby heating said tube and transferring heat to the stream of material flowing therethrough whereby the temperature effecting expansion of said tube is intermediate the temperatures inside and outside said tube and depends in part upon the amount of heat transferred from the inner wall of said tube to the stream flowing therein; means responsive to the axial expansion and contraction of said intermediate-temperature tube for controlling said burner to supply less heat when said expansible tube expands and to supply more heat when said expansible tube contracts to maintain said stream at a desired temperature of such a degree that a portion thereof will vaporize in said elongated passage; and a jet-producing discharge means communicating with the discharge end of said elongated passage for receiving and expanding the continuously-flowing stream discharged from said elongated passage and thus controlling the pressure in said expansible tube, said discharge means having a passage of a size proportioned to said delivery rate of said pump means and the character of spray desired, said expansible tube and control means being so constructed and arranged as to relatively correlate the supply of burner-fuel to said pump delivery and discharge passage size to thus maintain said desired temperature, whereby said high velocity jet of substantially constant temperature and character will be produced.

5. An apparatus for producing a jet-like spray of constant character containing a liquid and water vapor, comprising, a heater including means defining an elongated passage having an inlet and an outlet, pump means for forcing a supply of liquid at a substantially uniform rate into said inlet of said elongated passage and for forcing said liquid through said elongated passage in the form of a stream, heating means for heating said stream as it flows through said elongated passage to a desired temperature of such a degree that a portion of the liquid of said stream will vaporize when discharged into the atmosphere, thermally responsive heat control means connected with said elongated passage and exposed to said stream, said thermally responsive heat control means being arranged and constructed so that it is responsive to variations in the thermal condition of said stream, said thermally responsive heat control means being operatively connected with said heating means for varying the amount of heat supplied thereby in accordance with variations in the temperature of said stream from the desired temperature to thus continuously attain said desired temperature, and spray discharge means in communication with the outlet of said elongated passage, said spray discharge means including a passage of a size so correlated to said rate of supply of said pump and to the temperature maintained by said thermally responsive heat control means as to produce a spray of said constant character.

6. An apparatus for producing a jet-like spray of constant character, comprising, a heater including an elongated passage having inlet and outlet ends, pump means for pumping a liquid at a substantially constant uniform rate and under a predetermined pressure into the inlet end of said elongated passage and for forcing said liquid to flow through said elongated passage in the form of a stream, heating means comprising a heating element for heating said stream as it passes through said elongated passage to impart thereto a desired physical condition such that when the stream is discharged into an atmosphere at a pressure lower than said predetermined pressure a portion thereof will vaporize, control means connected with the outlet end of said elongated passage and arranged and constructed so that it is responsive to variations in the physical condition of said stream flowing from said elongated passage, said control means being operatively connected with said heating means for controlling the amount of heat supplied by said heating element in accordance with variations from said desired physical condition of said stream to thus impart said desired physical condition to said stream, a spray discharge means, and means establishing communication between said elongated passage and said spray discharge means, said spray discharge means including a passage of a size so correlated to the constant rate of supply of said pump and to the operation of said control means as to produce a spray of said constant character.

7. An apparatus for producing a jet-like spray of constant character containing water vapor, comprising, a heater including means defining a tortuous passage having an inlet and an outlet, pump means for pumping a supply of liquid under superatmospheric pressure at a substantially constant uniform rate into said inlet of said tortuous passage and for forcing said liquid through said tortuous passage in the form of a stream, heating means for heating said stream as it passes through said tortuous passage to a desired temperature of such a degree that a portion of said liquid will vaporize when discharged into an atmosphere at a pressure lower than said superatmospheric pressure, thermally responsive heat control means connected with said tortuous passage and in the path of flow of said stream, said thermally responsive heat control means being arranged and constructed so that it is responsive to variations in the thermal condition of said stream, said thermally responsive heat control means being operatively connected with said heating means for varying the amount of heat supplied thereby in accordance with variations in the temperature of said stream from the desired temperature to thus continuously attain said desired temperature, and spray discharge means in communication with the outlet of said tortuous passage, said spray discharge means including a passage of a size so correlated to said substantially constant rate of supply of said pump and to the temperature maintained by said thermally responsive heat control means as to produce a spray of said constant character.

8. The method of forming a jet of constant character containing steam, water and at least one other material which comprises producing a mixture of water and at least one other material by adding one to the other, placing said mixture under a predetermined pressure, pumping said mixture through an elongated heating zone in the form of a stream at a substantially uniform predetermined rate, said pressure being sufficiently high to overcome any frictional resistance to the flow of said stream and to impart thereto a velocity sufficient to maintain a substantially uniform dispersion of one of said materials in the other during flow through said elongated heating zone, heating said stream or mixture during flow to a desired temperature of such a degree that when said stream or mixture is discharged into an atmosphere at a pressure lower than said predetermined pressure at least a portion of said water will vaporize, varying said heating in accordance with variations in the temperature of said stream from the desired temperature to thus continuously attain said desired temperature, and discharging said heated stream into said atmosphere at a rate so correlated to said uniform predetermined rate of pumping and desired temperature as to thereby flash at least a portion of said water into vapor.

9. The method of forming a jet of constant character containing steam which comprises, placing a liquid under superatmospheric pressure, pumping said liquid through an elongated heating zone in the form of a stream at a substantially uniform rate, said pressure being sufficiently high to overcome any frictional resistance to the flow of said stream, heating said stream during flow to a desired temperature of such a degree that a portion of said liquid will vaporize in said elongated heating zone, varying said heating in accordance with variations in the temperature of said stream from the desired temperature to thus continuously attain said desired temperature, discharging said liquid into an atmosphere at a pressure lower than said superatmospheric pressure at a rate so correlated to said substantially uniform rate of pumping and desired temperature as to thereby flash at least a portion of said liquid into vapor.

10. The method of forming a heated spray of constant character containing water vapor and at least one other material, which comprises, producing a mixture of water and at least one other material by adding one material to the other, pumping said mixture in the form of a stream under superatmospheric pressure and at a substantially constant uniform predetermined rate through an elongated heating zone, said pressure being sufficiently high to overcome any frictional resistance to the flow of said stream and to impart thereto a velocity sufficient to maintain one of said materials dispersed in the other during flow through said elongated heating zone, supplying fuel for progressively heating said stream during said flow to impart a desired predetermined physical condition thereto such that when the mixture is discharged into an atmosphere at a pressure lower than said superatmospheric pressure a portion of said water will vaporize, the volume of fuel supplied being independent of said rate of pumping, whereby said volume may be varied to compensate for variations in the stream from the desired physical condition to thus obtain said desired predetermined physical condition of said stream, and discharging the heated mixture into an atmosphere at a pressure lower than said superatmospheric pressure at a rate so correlated to the substantially constant predetermined rate of pumping and desired physical condition as to thereby form a spray of said constant character.

11. The method of forming a heated spray of constant character containing water vapor and at least one other material, which comprises, producing a mixture of water and at least one other material by adding one material to the other, pumping said mixture in the form of a stream under superatmospheric pressure and at a substantially constant uniform predetermined rate through an elongated heating zone, said pressure being sufficiently high to overcome any frictional resistance to the flow of said stream and to impart thereto a velocity sufficient to maintain one of said materials dispersed in the other during flow through said elongated heating zone, progressively heating said stream during said flow to impart a desired predetermined physical condition thereto such that when the mixture is discharged into an atmosphere at a pressure lower than said superatmospheric pressure a portion of said water will vaporize, varying said heating in accordance with variations from the desired physical condition of the stream at a point adjacent to the discharge end of said heating zone to thus obtain said desired predetermined physical condition of said stream, and discharging the heated mixture into an atmosphere at a pressure lower than said superatmospheric pressure at a rate so correlated to the substantially constant predetermined rate of pumping and desired physical condition as to thereby form a spray of said constant character.

12. An apparatus for producing a jet-like spray of constant character containing water vapor, comprising, a heater including means defining a tortuous passage having an inlet and an outlet, pump means for pumping a supply of liquid under superatmospheric pressure at a substantially uniform rate into said inlet of said tortuous passage and for forcing said liquid through said tortuous passage in the form of a stream, heating means for heating said stream as it passes through said tortuous passage to a desired temperature of such a degree that a portion of said liquid will vaporize when discharged into an atmosphere at a pressure lower than said superatmospheric pressure, thermally responsive heat control means connected with the said tortuous passage and in the path of flow of said stream, said thermally responsive heat control means being arranged and constructed so that it is responsive to variations in the thermal condition of said stream, said thermally responsive heat control means being operatively connected with said heating means for varying the amount of heat supplied thereby in accordance with variations in the temperature of said stream from the desired temperature to thus continuously attain said desired temperature, and spray discharge means directly connected to the discharge end of said thermally responsive heat control means, said spray discharge means including a passage of a size so correlated to said substantially uniform rate of supply of said pump and to the temperature maintained by said thermally responsive heat control means as to produce a spray of said constant character.

13. The method of forming a jet of constant character containing steam which comprises, pumping a liquid under superatmospheric pressure through an elongated heating zone in the form of a stream at a substantially uniform rate, heating said stream during flow to a temperature of such a degree that a portion of said liquid will vaporize and form small steam bubbles in said elongated heating zone and another portion of said liquid will be converted into vapor upon venting or discharging into an atmosphere under a pressure lower than said superatmospheric pressure, said uniform rate of pumping being such as to impart a velocity to said stream sufficient to maintain said steam bubbles substantially dispersed in said stream from the time of their entrainment in said stream until the time of discharge, varying said heating in accordance with variations in the temperature of said stream from the desired temperature at a point adjacent to the discharge end of said elongated heating zone to thus attain said desired temperature, and discharging said stream into an atmosphere at a pressure lower than said superatmospheric pressure at a rate so correlated to said substantially uniform rate of pumping and desired temperature as to produce a spray of said constant character.

WALTER B. KERRICK.

---

CERTIFICATE OF CORRECTION.

Patent No. 2,104,705.  January 4, 1938.

WALTER B. KERRICK.

It is hereby certified that error appears in the printed specification of the above numbered patent requiring correction as follows: Page 4, first column, line 26, for the numeral "30" read 55'; line 38, for "55'" read 30; page 5, first column, line 57, claim 4, for "across" read cross, and that the said Letters Patent should be read with these corrections therein that the same may conform to the record of the case in the Patent Office.

Signed and sealed this 15th day of March, A. D. 1938.

Henry Van Arsdale,
Acting Commissioner of Patents.

(Seal)

during said flow to impart a desired predetermined physical condition thereto such that when the mixture is discharged into an atmosphere at a pressure lower than said superatmospheric pressure a portion of said water will vaporize, varying said heating in accordance with variations from the desired physical condition of the stream at a point adjacent to the discharge end of said heating zone to thus obtain said desired predetermined physical condition of said stream, and discharging the heated mixture into an atmosphere at a pressure lower than said superatmospheric pressure at a rate so correlated to the substantially constant predetermined rate of pumping and desired physical condition as to thereby form a spray of said constant character.

12. An apparatus for producing a jet-like spray of constant character containing water vapor, comprising, a heater including means defining a tortuous passage having an inlet and an outlet, pump means for pumping a supply of liquid under superatmospheric pressure at a substantially uniform rate into said inlet of said tortuous passage and for forcing said liquid through said tortuous passage in the form of a stream, heating means for heating said stream as it passes through said tortuous passage to a desired temperature of such a degree that a portion of said liquid will vaporize when discharged into an atmosphere at a pressure lower than said superatmospheric pressure, thermally responsive heat control means connected with the said tortuous passage and in the path of flow of said stream, said thermally responsive heat control means being arranged and constructed so that it is responsive to variations in the thermal condition of said stream, said thermally responsive heat control means being operatively connected with said heating means for varying the amount of heat supplied thereby in accordance with variations in the temperature of said stream from the desired temperature to thus continuously attain said desired temperature, and spray discharge means directly connected to the discharge end of said thermally responsive heat control means, said spray discharge means including a passage of a size so correlated to said substantially uniform rate of supply of said pump and to the temperature maintained by said thermally responsive heat control means as to produce a spray of said constant character.

13. The method of forming a jet of constant character containing steam which comprises, pumping a liquid under superatmospheric pressure through an elongated heating zone in the form of a stream at a substantially uniform rate, heating said stream during flow to a temperature of such a degree that a portion of said liquid will vaporize and form small steam bubbles in said elongated heating zone and another portion of said liquid will be converted into vapor upon venting or discharging into an atmosphere under a pressure lower than said superatmospheric pressure, said uniform rate of pumping being such as to impart a velocity to said stream sufficient to maintain said steam bubbles substantially dispersed in said stream from the time of their entrainment in said stream until the time of discharge, varying said heating in accordance with variations in the temperature of said stream from the desired temperature at a point adjacent to the discharge end of said elongated heating zone to thus attain said desired temperature, and discharging said stream into an atmosphere at a pressure lower than said superatmospheric pressure at a rate so correlated to said substantially uniform rate of pumping and desired temperature as to produce a spray of said constant character.

WALTER B. KERRICK.

---

CERTIFICATE OF CORRECTION.

Patent No. 2,104,705.  January 4, 1938.

WALTER B. KERRICK.

It is hereby certified that error appears in the printed specification of the above numbered patent requiring correction as follows: Page 4, first column, line 26, for the numeral "30" read 55'; line 38, for "55'" read 30; page 5, first column, line 57, claim 4, for "across" read cross, and that the said Letters Patent should be read with these corrections therein that the same may conform to the record of the case in the Patent Office.

Signed and sealed this 15th day of March, A. D. 1938.

Henry Van Arsdale,
Acting Commissioner of Patents.

(Seal)

CERTIFICATE OF CORRECTION.

Patent No. 2,104,705.                                         January 4, 1938.

WALTER B. KERRICK.

It is hereby certified that error appears in the printed specification of the above numbered patent requiring correction as follows: Page 4, first column, line 26, for the numeral "30" read 55'; line 38, for "55'" read 30; page 5, first column, line 57, claim 4, for "across" read cross, and that the said Letters Patent should be read with these corrections therein that the same may conform to the record of the case in the Patent Office.

Signed and sealed this 15th day of March, A. D. 1938.

(Seal)

Henry Van Arsdale,
Acting Commissioner of Patents.